July 1, 1924. 1,499,643

C. DORNIER

MOUNTING OF PARACHUTES

Filed Nov. 17, 1922

INVENTOR:
Claudius Dornier.
by Pinschow
Atty.

Patented July 1, 1924.

1,499,643

UNITED STATES PATENT OFFICE.

CLAUDIUS DORNIER, OF FRIEDRICHSHAFEN-ON-THE-BODENSEE, GERMANY, ASSIGNOR OF ONE-HALF TO THE FIRM: DORNIER, METALLBAUTEN GESELLSCHAFT MIT BESCHRANKTER HAFTUNG, OF FRIEDRICHSHAFEN, GERMANY.

MOUNTING OF PARACHUTES.

Application filed November 17, 1922. Serial No. 601,596.

To all whom it may concern:

Be it known that I, CLAUDIUS DORNIER, a citizen of Germany, residing at Friedrichshafen-on-the-Bodensee, Germany, have invented certain new and useful Improvements in the Mounting of Parachutes, of which the following is a specification.

My invention has reference to the mounting of parachutes in air craft, and it is one of the important objects of this invention to provide means for the manipulation of parachutes whereby they will become immediately available in case of emergency.

The means heretofore suggested for the mounting of parachutes only provided for the immediate jumping off without any tedious preparations in the case of open air craft by mounting the parachute upon the hull of the air craft behind the seat, or by using the parachute itself as a seat.

All these arrangements, however, are not applicable in the case of air craft with closed cabins.

In accordance with my invention means are provided in connection with air craft of the kind referred to adapted to allow the operation of any amount of parachutes at any time by mounting the parachutes in cavities of the supporting frame of the air craft in the vicinity of apertures in the cabin from which the jumping off may be immediately effected. The fastening or buckling belts or the like attached to the parachute may be either permanently arranged within easy reach of the operator, and possibly in the interior of the car, or they may be kept in the particular containing space together with the parachute. In the latter case provision is preferably made to allow of their being pulled out from the containing space by a rope or the like to a sufficient extent to allow of the fastening or buckling of the device to the body of the aviator.

Figure 1:
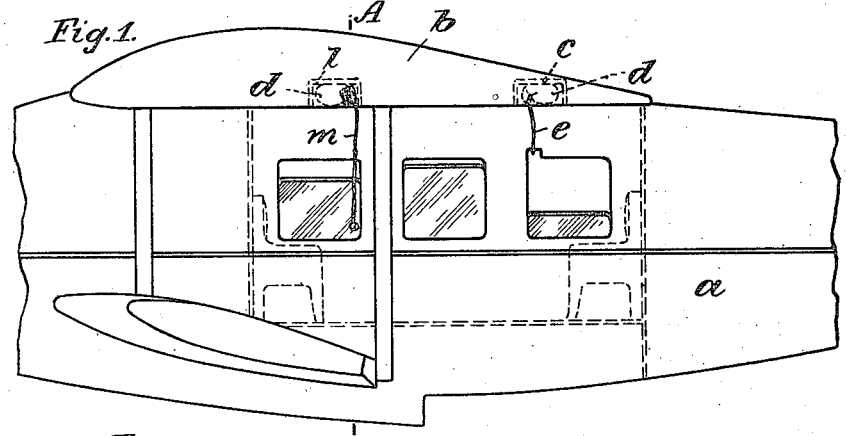
Figure 2:
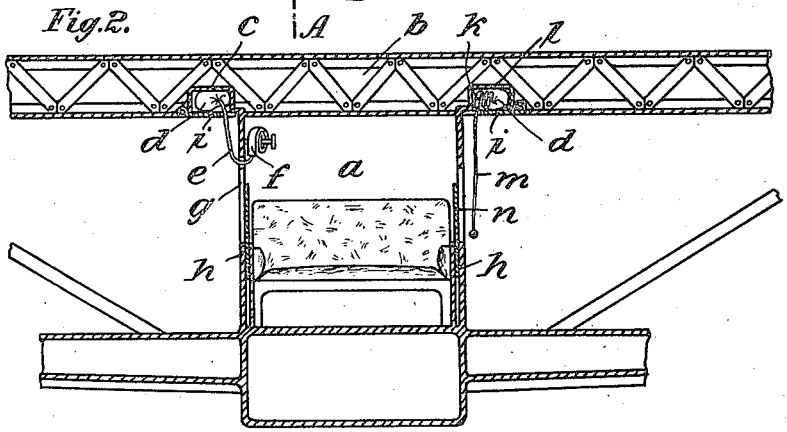
Figure 3:
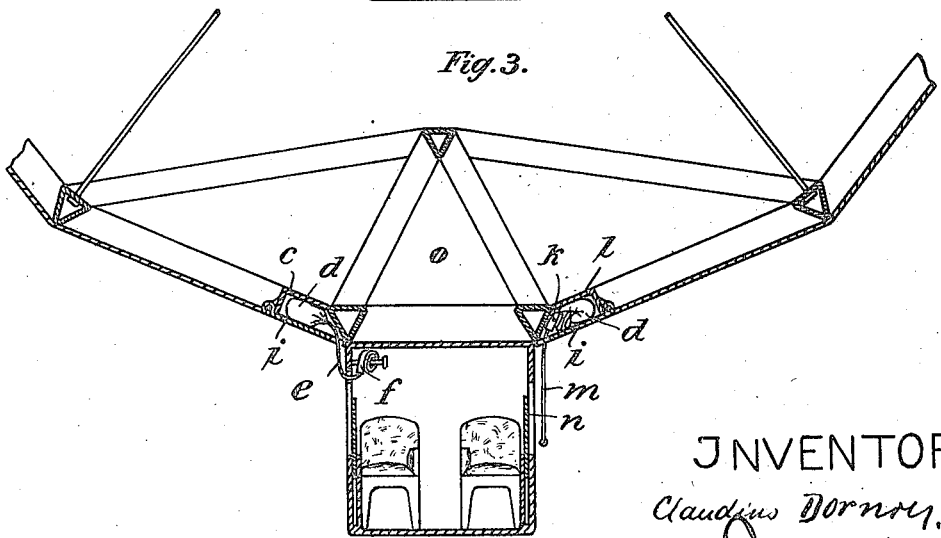

The invention is shown by way of example in the accompanying drawing,

Figure 1 being a partial side view of an air craft provided with the safety device embodying the principles of my invention, Figure 2 is a sectional view on the line A—A of Figure 1, Figure 3 is a cross section through part of a rigid air ship with the invention applied to it.

Figures 1 and 2 show the supporting wing $b$ as being directly mounted upon the hull $a$ which is only partially shown. Spaces $c$ are provided in the deck portion $b$ for the accommodation of the parachutes $d$. The ropes $e$ for connecting the parachutes with the buckling belts or the like $f$ may be passed through an aperture or a recessed portion $g$ in the window frame $h$ and into the passenger room so as to provide for the immediate possibility of attaching the buckling belts $f$ to the body of the aviator, and to afford the possibility of unimpeded jumping off at any time in case of emergency after the opening of the windows. Provision is made in this connection for the swinging downwards of the hingedly secured bottom $i$ of the container $c$. Springs are preferably provided for the automatic reclosing of the cover $i$.

At the right hand part of Figure 2 a somewhat modified arrangement is shown. In accordance therewith the buckling belt together with the parachute is mounted in the container $l$. To the buckling belt $k$ or the like a pulling rope $m$ is secured which is made to descend at the outside of the window $n$ to a sufficient extent to allow of its being easily taken hold of upon the opening of the window. By means of this pulling rope $m$ the buckling belt $k$ or the like may be readily pulled out from the container $l$, while the parachute remains therein.

Figure 3 is a representation similar to Figure 2 with the difference, however, that instead of a supporting deck $b$ of Figures 1 and 2 the body $o$ of the rigid air ship is employed. Two passenger seats are shown here by way of example.

The invention is susceptible of various other forms of constructions and embodiments of the principles thereof to adapt it to varying conditions of application, and without deviating from the spirit of the invention as pointed out in the claims.

I claim:—

1. Aircraft comprising in combination, a hull, a closed cabin suspended from and closely adjoining said hull, a receptacle in said hull directly adjoining an outer wall of said cabin above an opening in said wall, a parachute stored in said receptacle and a cord suspended from said parachute in front of said opening.

2. Aircraft comprising in combination, a hull, a closed cabin suspended from and closely adjoining said hull, a receptacle in said hull directly adjoining an outer wall of said cabin above an opening in said wall, a parachute stored in said receptacle, a cord suspended from said parachute in front of said opening and means inside said cabin for attaching the free end of said cord extending through said opening.

In testimony whereof I affix my signature.

CLAUDIUS DORNIER.